United States Patent
Yang

(10) Patent No.: US 8,490,593 B2
(45) Date of Patent: Jul. 23, 2013

(54) SPLIT-TYPE AUXILIARY POWER COMBUSTION AND EMERGENCY STARTING SYSTEM

(76) Inventor: Tai-Her Yang, Dzan-Hwa (TW)

( * ) Notice: Subject to any disclaimer, the term of this patent is extended or adjusted under 35 U.S.C. 154(b) by 1003 days.

(21) Appl. No.: 12/457,716

(22) Filed: Jun. 19, 2009

(65) Prior Publication Data

US 2010/0319645 A1    Dec. 23, 2010

(51) Int. Cl.
*F02P 15/00* (2006.01)
*F02D 41/06* (2006.01)

(52) U.S. Cl.
USPC .................. 123/179.5; 123/179.28; 123/605; 123/618; 123/491

(58) Field of Classification Search
USPC .............. 123/179.3, 179.5, 179.12, 179.14, 123/179.16, 179.24, 179.28, 601, 605, 618, 123/491; 307/48; 320/166; 73/114.58, 114.59; 701/113
See application file for complete search history.

(56) References Cited

U.S. PATENT DOCUMENTS

| | | | | |
|---|---|---|---|---|
| 3,560,833 A | * | 2/1971 | Kazuo et al. | 363/18 |
| 4,127,782 A | * | 11/1978 | Omura et al. | 307/10.1 |
| 7,690,343 B2 | * | 4/2010 | Doljack | 123/179.28 |
| 7,938,092 B2 | * | 5/2011 | Yang | 123/179.28 |
| 8,164,206 B2 | * | 4/2012 | Gibson et al. | 290/38 R |

* cited by examiner

*Primary Examiner* — Hai Huynh
(74) *Attorney, Agent, or Firm* — Bacon & Thomas, PLLC

(57) ABSTRACT

The present invention is an installation of an emergency starting switching device and/or direct current boosted boost circuit device. When the power of the starting battery is insufficient, the electric energy of the power storage device battery is used to drive the starting motor in order to start the engine by operating the emergency starting switching device. And when the engine is started, the voltage of the ignition device or the fuel injection device is stepped up to strengthen its starting capability by means of a voltage boost by the direct current boosted boost circuit device.

6 Claims, 5 Drawing Sheets

SPLIT-TYPE AUXILIARY POWER COMBUSTION AND EMERGENCY STARTING SYSTEM

BACKGROUND OF THE INVENTION (a) Field of the Invention

The present invention relates to a split-type auxiliary power combustion and emergency starting system that relies on the installation of an auxiliary power storage device that exclusively supplies the required electric energy to the ignition or fuel injection devices, and on the installation of a split-type charging power to isolate battery power for starting motor, in order to prevent the sudden drop of the working voltage of the ignition device or the fuel injection device that can hinder normal engine start due to the substantial drop of battery voltage as a result of the greater current required in starting motor when the engine is started. Furthermore, the system is equipped with emergency starting switching device 500 and/ or direct current boosted boost circuit device 600 so that when starting battery power is insufficient during starting, the electric energy of the power storage device battery can drive and starting motor in order to start the engine by means of operating the emergency starting switching device; and that the voltage boost of the direct current boosted boost circuit device 600 will enable the ignition device or the fuel injection device to step up in order to strengthen its starting capability when the motor is started to start the engine.

Furthermore, for application on manually started engine that are not installed with starting motor and starting battery, the installation of a direct current boosted boost circuit device 600 can provide normal working voltage and obtain excellent combustion at the starting stage when engine speed is relatively low and generator voltage is insufficient.

(b) Description of the Prior Art

Traditional engine ignition or fuel injection system normally shares common battery power with the engine starting motor. Therefore, when the engine is started, the battery voltage drops (normally drops by 25-40%) due to the motor's high starting current. This causes poor ignition or the slowing down of the fuel injection device switch speed which in turn makes it hard to start the engine. Moreover, when the power of the starting battery is insufficient, external power is needed for relief. Not only is this inefficient but also inconvenient.

SUMMARY OF THE INVENTION

The present invention relates to a split-type auxiliary power combustion and emergency starting system that relies on the installation of an auxiliary power storage device that exclusively supplies the required electric energy to the ignition device or the fuel injection device, and on the installation of a split-type charging power to isolate battery power for starting motor, in order to prevent the sudden drop of the working voltage of the ignition device or the fuel injection device that can hinder normal engine start due to the substantial drop of battery voltage as a result of the greater current required in starting motor when the engine is started. Furthermore, the system is equipped with emergency starting switching device 500 and/or direct current boosted boost circuit device 600 so that when starting battery power is insufficient during starting, the electric energy of the power storage device battery can drive and starting motor in order to start the engine by means of operating the emergency starting switching device; and that the voltage boost of the direct current boosted boost circuit device 600 will enable the ignition device or the fuel injection device to step up in order to strengthen its starting capability when the motor is started to start the engine.

Furthermore, for application on manually started engine that are not installed with starting motor and starting battery, the installation of a direct current boosted boost circuit device 600 can provide normal working voltage and ensure excellent ignition when engine speed is relatively low and generator voltage is insufficient.

DESCRIPTION OF MAIN COMPONENT SYMBOLS

Figure 1:
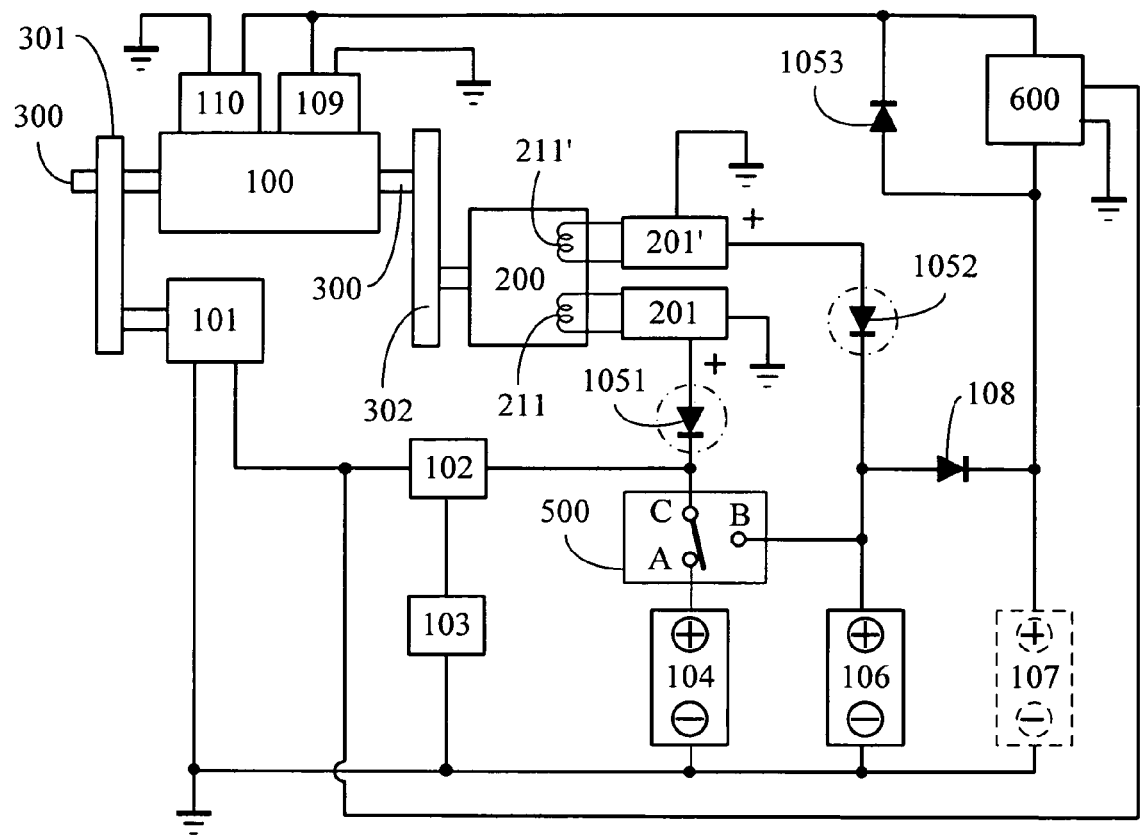
FIG. 1 is a circuit block diagram of a split-type auxiliary power combustion and emergency starting system

100: Engine set
101: Starting motor
102: Relay
103: Starting switch
104: Starting battery
105: Isolation diode
106: Primary charging and discharging auxiliary power storage device
107: Secondary charging and discharging auxiliary power storage device
108: Isolation diode
109: Engine ignition device
110: Fuel injection device
200: Generator
201, 201': Regulating devices
211, 211': Generator windings
300: Engine rotating shaft
301, 302: Transmission device
500: Emergency starting switching device
600: Direct current boosted boost circuit device
1051, 1052, 1053: Diodes

DETAILED DESCRIPTION OF THE PREFERRED EMBODIMENTS

The present invention relates to a split-type auxiliary power combustion and emergency starting system that relies on the installation of an auxiliary power storage device that exclusively supplies the required electric energy to the ignition or fuel injection devices, and on the installation of a split-type charging power to isolate battery power for starting motor, in order to prevent the sudden drop of the working voltage of the ignition device or the fuel injection device that can hinder normal engine start due to the substantial drop of battery voltage as a result of the greater current required in starting motor when the engine is started. Furthermore, the system is equipped with emergency starting switching device 500 and/or direct current boosted boost circuit device 600 so that when starting battery power is insufficient during starting, the electric energy of the power storage device battery can drive and starting motor in order to start the engine by means of operating the emergency starting switching device 500; and that the voltage boost of the direct current boosted boost circuit device 600 will enable the ignition device or the fuel injection device to step up in order to strengthen its starting capability when the motor is started to start the engine.

Furthermore, for application on manually started engine that are not installed with starting motor and starting battery, the installation of a direct current boosted boost circuit device 600 can provide normal working voltage and to ensure excellent combustion at the starting stage when engine speed is relatively low and generator voltage is insufficient.

FIG. 1 is a circuit block diagram of a split-type auxiliary power combustion and emergency starting system that relies on the installation of an auxiliary power storage device which exclusively supplies required electric energy to the ignition and/or fuel injection devices and for emergency starts, and on the installation of a split-type charging power to isolate battery power for starting the motor, as well as on the installation of a emergency starting switching device 500 and/or direct current boosted boost circuit device 600; it mainly consists of the following:

Engine set 100: Consists of internal combustion engine using diesel, biodiesel, gasoline, natural gas or methanol as fuel and equipped with a starting motor 101;

Engine rotating shaft 300: Supply rotating kinetic energy engine output to drive loads, and to couple with the starting motor 101 by means of the transmission device 301, directly or by means of the transmission device 302 to couple with the generator set 200;

Starting motor 101: Consists of brush or brushless direct current or alternating current motors or generators with motor capability, and by operating the motor start relay 102, the battery electric energy is controlled to drive the starting motor 101, directly or through the transmission device 301 affecting the generator set 100;

Starting switch 103: Consists of electromechanical switching elements or solid state electronic switching elements to supply and control power from starting battery 104 to the ignition device or the ignition device and/or the fuel injection device 110; and/or to supply power and control motor to start relay 102; or to directly supply power and control staring motor 101; and/or to supply power to other car electrical devices;

Starting battery 104: Consists of various rechargeable secondary batteries or super capacitance to supply electric energy to the starting motor 101; and to accept the electric energy generated by the generator winding 211 of the generator 200 or external charging energy;

Primary charging and discharging auxiliary power storage device 106: Consists of various charging and discharging batteries or super capacitance to store generated electric energy from the starting motor 104 or from the generator winding 211' of the engine-driven generator 200; or to accept electric energy from external charging devices;

Secondary charging and discharging auxiliary power storage device 107: Consists of a secondary charging and discharging battery or super capacitance to store electrical energy from the primary charging and discharging auxiliary power storage device 106 in order to supply instant electric energy to the engine ignition device 109 during engine ignition;

Isolation diode 108: Located between the primary charging and discharging auxiliary power storage device 106 and the secondary charging and discharging auxiliary power storage device 107, and the current direction from the primary charging and discharging auxiliary power storage device 106 to the secondary charging and discharging auxiliary power storage device 107 is in series with the isolation diode 108 in order to prevent reverse discharge by the secondary charging and discharging auxiliary power storage device 107 on the primary charging and discharging auxiliary power storage device 106 when using the primary charging and discharging auxiliary power storage device 106 as the power source in starting the motor in an emergency while operating the emergency starting switching device 500;

Generator 200: Consists of alternating or direct current generator driven by the engine directly or through a transmission device 302, and the generator 200 has at least two mutually insulated generator windings 211 and 211' to separately generate relative alternating electric energy or to deliver rectified direct current electric energy output or to directly generate direct current electric energy output;

By means of the mutually insulated generator windings 211 and 211' installed in the generator 200, the electric energies of the starting battery 104 and the primary charging and discharging auxiliary power storage device 106 are isolated from each other so that when generator 200 becomes a direct current direct current generator and generator windings 211 and/or 211' do not possess reverse current avoidance function; and/or regulating devices 201 and/or 201' do not possess reverse current avoidance function; isolation is then made according to the charging current direction by the generator winding 211 on the starting battery 104 through the regulating device 201 and the forward series installation of diode 1051. Isolation is also made according to the charging current direction by the generator winding 211' on the primary charging and discharging auxiliary power storage device 106 through the regulating device 201' and the forward series installation of diode 1052;

If generator winding 211 and/or generator winding 211' possess reverse current avoidance function or the regulating device 201 and/or regulating device 201' possess reverse current avoidance function, then the installation of diodes 1051 and 1052 are unnecessary;

Regulating devices 201 and 201': Consist of electromechanical type or solid state electronic circuits to directly regulate and separately charge the starting battery 104, the primary charging and discharging auxiliary power storage device 106, the secondary charging and discharging auxiliary power storage device 107, and to supply power to other loads when the generator 200 becomes a direct current generator; however, when the generator 200 becomes an alternating current generator, the alternating current electric energy must be first rectified to direct current then passed through a regulating device 201 before it can charge the starting battery 104, and/or the primary charging and discharging auxiliary power storage device 106, and/or the secondary charging and discharging auxiliary power storage device 107, and to supply power to other loads;

Engine ignition device 109: Consists of electromechanical circuit elements or solid state electronic circuit elements or the combination of both elements to provide ignition to an internal combustion engine for running the engine;

Fuel injection device 110: Consists of a fuel injection structural device with throttle switching function to control injection width, and circuit control devices for operating fuel injection structural devices that are able to refer to throttle opening, oil temperature, air intake temperature, and oxygen-containing crankshaft signals (IP-ARB);

Any one or both of the engine ignition device 109 and the fuel injection device 110 are installed.

Any one or both of the emergency starting switching device 500 and the direct current boosted boost circuit device 600 are installed, and these include:

Emergency starting switching device 500: Consists of three-terminal type solid state electronic switching device or mechanical switching device, and the common C terminal is the positive power terminal leading to the motor starting relay 102 and starting switch 103, and the normally closed A terminal is the positive terminal leading to the starting battery 104, and the normally opened B terminal which is switch able to closed during an emergency is the positive terminal leading to the primary charging and discharging auxiliary power storage device 106. When battery starting power is insufficient, operating the auxiliary switching device can enable the auxiliary battery electric energy to drive and start the motor which in turn will start the engine.

Direct current boosted boost device 600: Consists of solid state electronic circuit elements or electromechanical circuit elements installed between the power mains of the secondary charging and discharging auxiliary power storage device 107 and the power mains of the engine ignition device 109 and the fuel injection device 110, and the direct current boosted boost circuit device 600 is started by the signal from the relay 102 when the motor power is turned on to increase voltage in order to enable the engine ignition device 109 or the fuel injection device 110 to run on a booster state advantageous to starting the engine; the diode 1053 is connected in parallel between the power input terminal of the direct current boosted boost circuit device 600 and the higher homopolar voltage output terminal. When the direct current boosted boost circuit device 600 stops operating, electric energy from the power terminal are delivered through the diode 1053 to the engine ignition device 109 and the fuel injection device 110.

During the application of the split-type auxiliary power combustion and emergency starting system, the primary charging and discharging auxiliary power storage device 106 can select elements with a higher energy density while the secondary charging and discharging auxiliary power storage device 107 can select elements with a higher power density to match ignition quality and economy.

As described in FIG. 1, the engine ignition device 109, fuel injection device 110, starting battery 104, primary charging and discharging auxiliary power storage device 106, isolation diode 108, secondary charging and discharging auxiliary power storage device 107, emergency starting switching device 500, generator 200, regulating device 201, regulating device 201', direct current boosted boost circuit device 600 are separately installed or combined by two or more of the aforementioned components.

Figure 2:
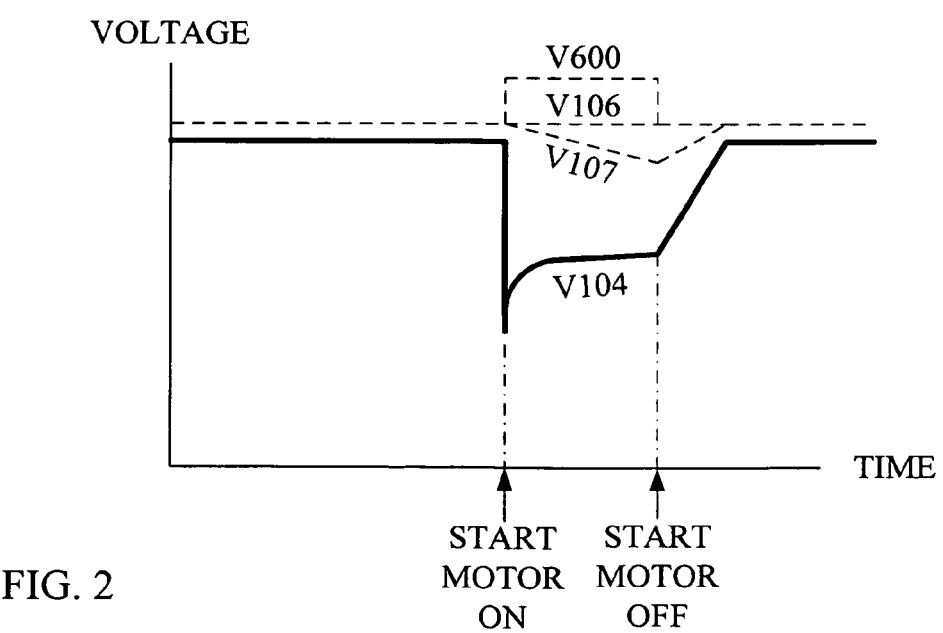
FIG. 2 is an operational diagram showing the variation of battery voltage and motor starting voltage in FIG. 1

FIG. 2 is an operational diagram showing the variation of the battery voltage and the motor start voltage in FIG. 1. As shown in FIG. 2, the voltage V106 is the terminal voltage of the primary charging and discharging auxiliary power storage device 106, Voltage V107 is the terminal voltage of the secondary charging and discharging auxiliary power storage device 107, V104 is the terminal voltage of the starting motor 104, and V600 is the output voltage of the direct current boosted boost circuit device 600.

Figure 3:
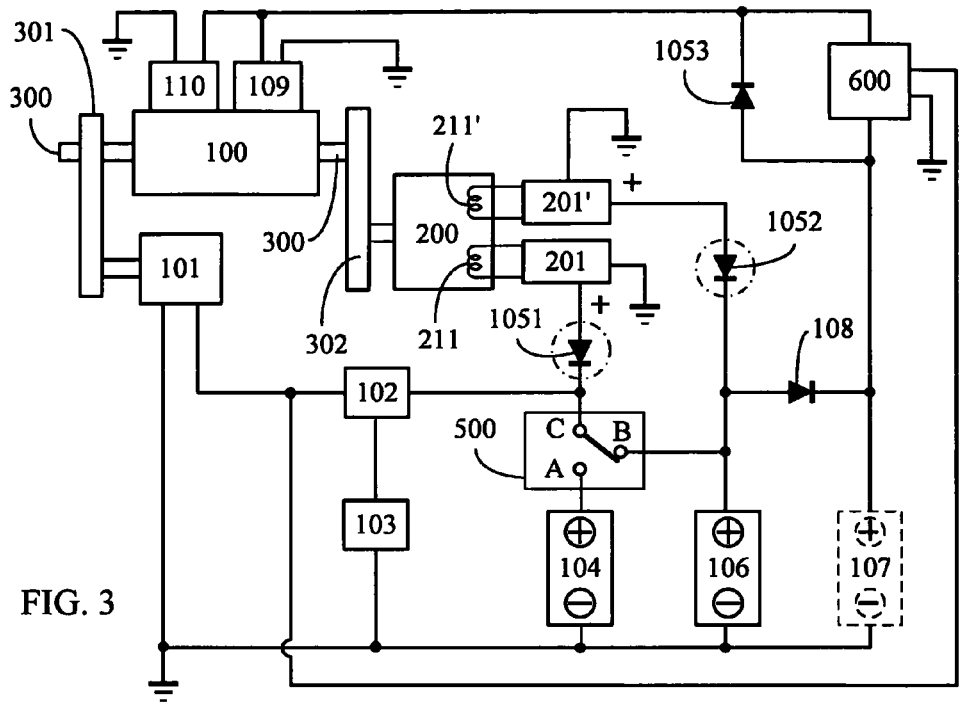
FIG. 3 is a circuit diagram of the auxiliary power electric energy starting the engine in FIG. 1

FIG. 3 is a circuit diagram of the auxiliary power electric energy starting the engine in FIG. 1.

Figure 4:
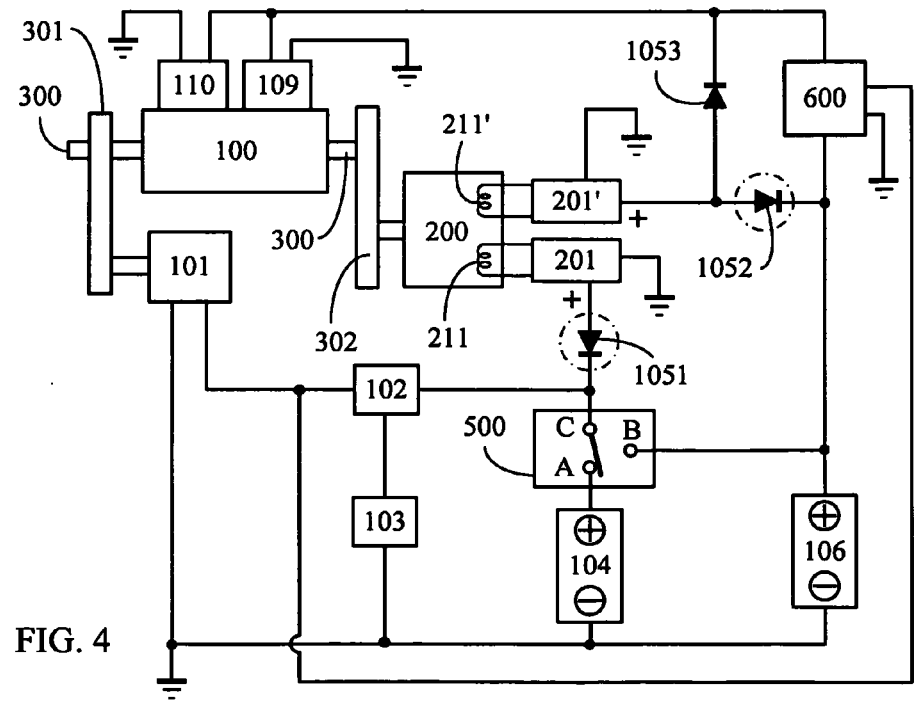
FIG. 4 is a circuit block diagram omitting a secondary charging and discharging auxiliary power storage device and isolation diode 108 in FIG. 1

Moreover, the split-type auxiliary power combustion and emergency starting system is further configured as shown in the circuit block diagram in FIG. 4 omitting the secondary charging and discharging auxiliary power storage device and the isolation diode 108 in FIG. 1; i.e., the secondary charging and discharging auxiliary power storage device 107 and the isolation diode 108 in FIG. 1 are omitted and will not be installed. The starting motor 104 accepts the generated electric energy from the generator winding 211 of generator 200, and through the regulating device 201, regulates and controls the charging. The primary charging and discharging auxiliary power storage device 106 accepts the generated electric energy from the generator 200 generator winding 211', and through the regulating device 201'. The primary charging and discharging auxiliary power storage device 106 provides the required electric energy to the engine ignition device 109 and the fuel injection device 110. By operating the emergency starting switching device 500 when motor starting power is insufficient, the electric energy of the primary charging and discharging auxiliary power storage device 106 is allowed to drive the starting motor in order to run the engine.

Both or any one of the emergency starting switching device 500 and/or the direct current boosted boost circuit device 600 are installed which shall include:

Emergency starting switching device 500: Consists of three-terminal type solid state electronic switching device or mechanical switching device. The common C terminal is the positive power terminal leading to the motor starting relay 102 and starting switch 103, the normally closed A terminal is the positive terminal leading to the starting battery 104, and the normally opened B terminal which is switch able to closed during an emergency is the positive terminal leading to the primary charging and discharging auxiliary power storage device 106; when battery starting power is insufficient, operating the auxiliary switching device can enable the auxiliary battery electric energy to drive and start the motor which in turn will start the engine;

Direct current boosted boost device 600: Consists of solid state electronic circuit elements or electromechanical circuit elements installed between the power mains of the primary charging and discharging auxiliary power storage device 106 and the power mains of the engine ignition device 109 and the fuel injection device 110, and the direct current boosted boost circuit device 600 is started by the signal from relay 102 when the motor power is turned on to increase voltage in order to enable the engine ignition device 109 or the fuel injection device 110 to run on a booster state advantageous to starting the engine, and the diode 1053 is connected in parallel between the power input terminal of the direct current boosted boost circuit device 600 and the higher homopolar voltage output terminal; when the direct current boosted boost circuit device 600 stops operating, electric energy from the power terminal are delivered through diode 1053 to the engine ignition device 109 and the fuel injection device 110;

If the engine is manually started without installing the starting motor 101 and the starting battery 104, then only the generator winding 211' and the regulating device 201' are needed to be installed in order to charge the primary charging and discharging auxiliary power storage device 106.

Figure 5:
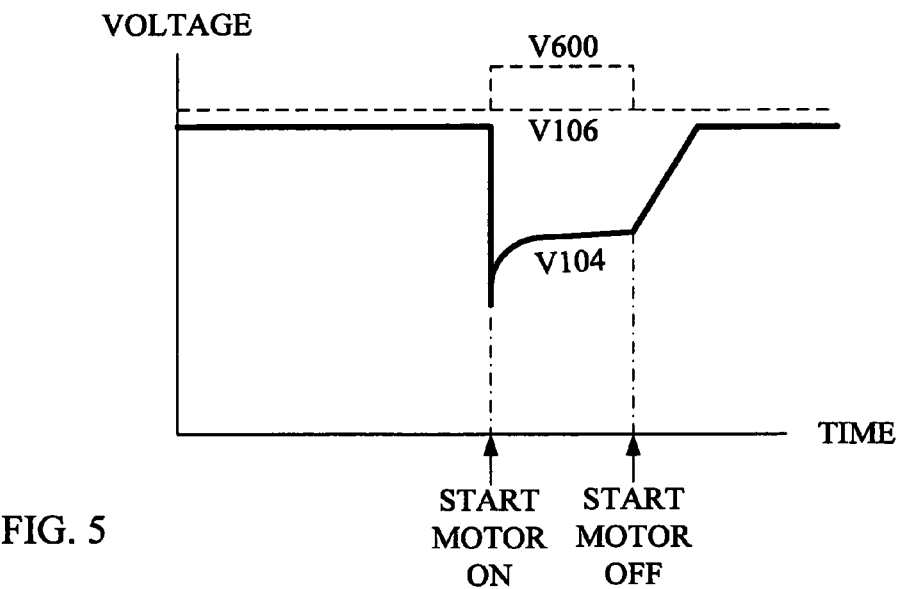
FIG. 5 is an operational diagram showing the variation of battery voltage and motor starting voltage in FIG. 4

FIG. 5 is an operational diagram showing the variation of the battery voltage and the motor start voltage in FIG. 4. As shown in FIG. 5, Voltage V106 is the terminal voltage of the primary charging and discharging auxiliary power storage device 106, V107 is the terminal voltage of the secondary charging and discharging auxiliary power storage device 107, V104 is the terminal voltage of the starting motor 104, and V600 is the output voltage of the direct current boosted boost circuit device 600.

Figure 6:
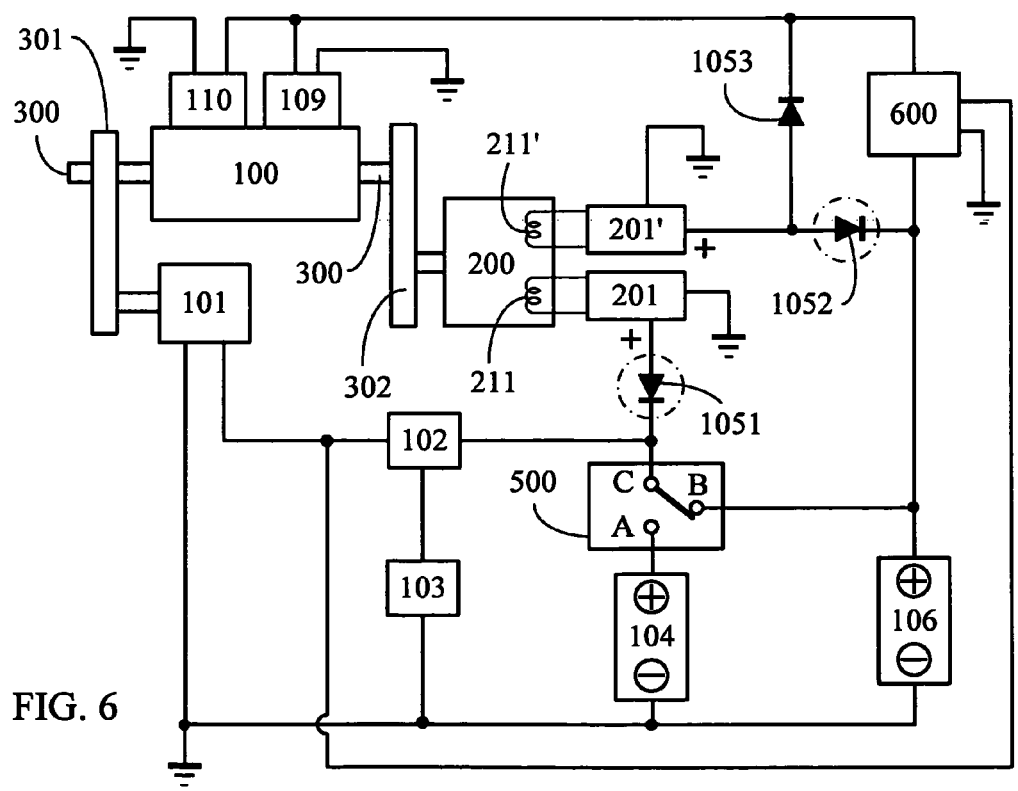
FIG. 6 is a circuit diagram of the auxiliary power electric energy starting the engine in FIG. 4

FIG. 6 is the circuit diagram of the auxiliary power electric energy starting the engine in FIG. 4

As described in FIG. 4, a split-type auxiliary power combustion and emergency starting system where its starting battery 104, engine ignition device 109, fuel injection device 110, primary charging and discharging auxiliary power storage device 106, emergency starting switching device 500, generator 200, regulating device 201, regulating device 201', direct current boosted boost circuit device 600 are separately installed or combined by two or more of the aforementioned components.

Figure 7:
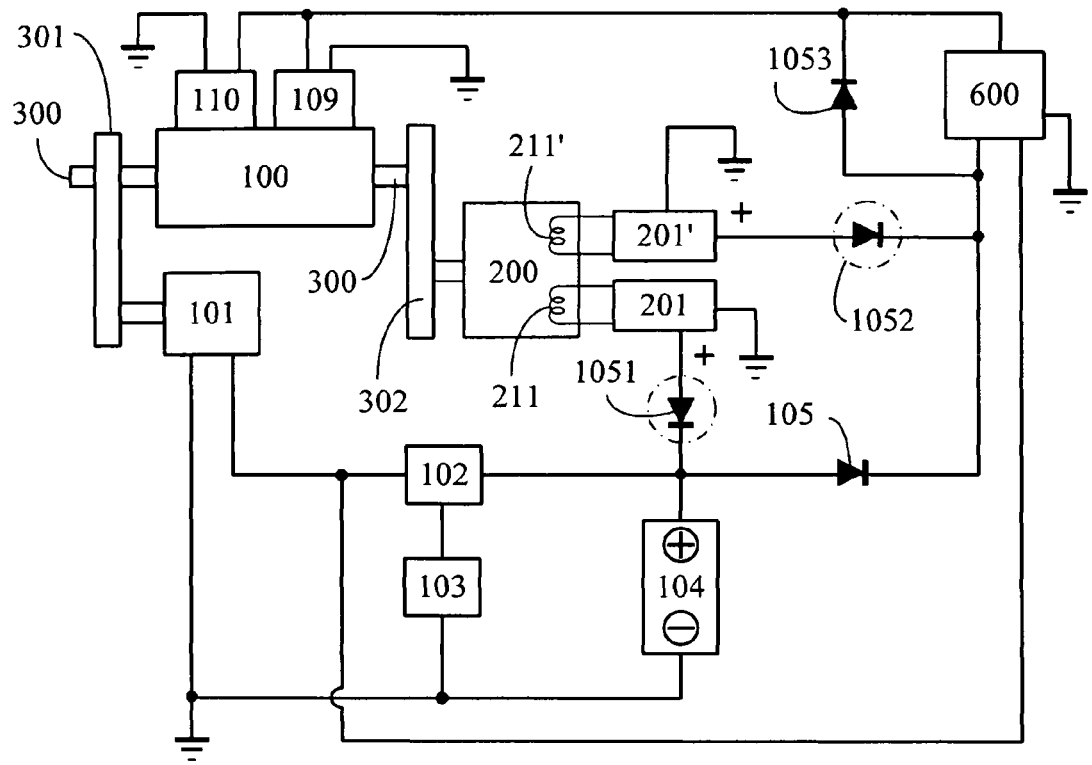
FIG. 7 is a circuit diagram formed by the installation of a direct current boosted boost circuit device of the present invention

FIG. 7 is the circuit diagram formed by the installation of a direct current boosted boost circuit device of the present invention.

Figure 8:
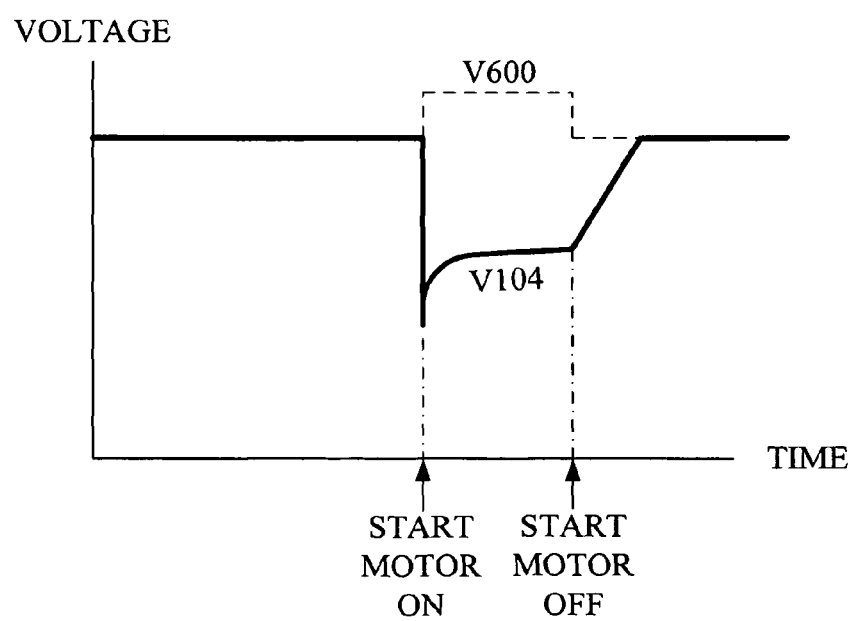
FIG. 8 is an operational diagram showing the variation of battery voltage and motor starting voltage in FIG. 7

FIG. 8 is an operational diagram showing the variation of the battery voltage and the motor start voltage in FIG. 7.

As shown in FIG. 7, the secondary charging and discharging auxiliary power storage device 107, isolation diode 108, primary charging and discharging auxiliary power storage device 106, and the emergency starting switching device 500 in FIG. 1 are omitted and not installed. Instead, the starting battery 104 is allowed to directly charge the direct current boosted boost circuit device 600. The main components include:

Engine set 100: Consists of internal combustion engine using diesel, biodiesel, gasoline, natural gas or methanol as fuel;

Engine rotating shaft 300: Supply rotating kinetic energy engine output to drive loads, and to couple with the starting motor 101 by means of the transmission device 301, directly or by means of the transmission device 302 to couple with the generator set 200;

Starting motor 101: Consists of brush or brushless direct current or alternating current motors or generators with motor capability. By operating the motor start relay 102, the battery electric energy is controlled to drive the starting motor 101, directly or through the transmission device 301 affecting the generator set 100;

Starting switch 103: Consists of electromechanical switching elements or solid state electronic switching elements to supply and control power from starting battery 104 to the ignition device or the ignition device and/or the fuel injection device 110; and/or to supply power and control motor starting relay 102; or to directly supply power and control staring motor 101; and/or to supply power to other car electrical devices;

Starting battery 104: Consists of various rechargeable secondary batteries or super capacitance to supply electric energy to the starting motor 101; and to accept the electric energy generated by the generator winding 211 of the generator 200 or external charging energy;

Generator 200: Consists of alternating or direct current generator driven by the engine directly or through a transmission device 302, and the generator 200 has at least two mutually insulated generator windings 211 and 211' to separately generate relative alternating electric energy or to deliver rectified direct current electric energy output or to directly generate direct current electric energy output;

By means of the mutually insulated generator windings 211 and 211' installed in the generator 200, the electric energies of the starting battery 104 and the primary charging and discharging auxiliary power storage device 106 are isolated from each other; when generator 200 becomes a direct current direct current generator and generator winding 211 does not possess reverse current avoidance function; and/or regulating device 201 does not possess reverse current avoidance function, isolation is made according to the charging current direction by the generator winding 211 on the starting battery 104 through the regulating device 201 and the forward series installation of diode 1051; when an isolation diode 105 is installed between the output power of the regulating device 201 and the starting battery 104 power, isolation is made according to the charging current direction by the generator winding 211' on the primary charging and discharging auxiliary power storage device 106 through the regulating device 201' and the forward series installation of diode 1052.

If the generator winding 211 possesses reverse current avoidance function, or the regulating device 201 possesses reverse current avoidance function, then it is unnecessary to install diode 1051;

Regulating devices 201 and 201': Consist of electromechanical type or solid state electronic circuits that separately employ the electric energy output of the generator windings 211 and 211' to directly regulate and separately charge the starting battery 104, and to supply power to other loads when the generator 200 becomes a direct current generator. However, when the generator 200 becomes an alternating current generator, the alternating current electric energy are first rectified to direct current then passed through a regulating device 201 before it can charge the starting battery 104, and to supply power to other loads;

Engine ignition device 109: Consists of electromechanical circuit elements or solid state electronic circuit elements or the combination of both elements to provide ignition to an internal combustion engine for running the engine;

Fuel injection device 110: Consists of a fuel injection structural device with throttle switching function to control injection width, and circuit control devices for operating fuel injection structural devices that are able to refer to throttle opening, oil temperature, air intake temperature, and oxygen-containing crankshaft signals (IP-ARB);

Any one or both of the engine ignition device 109 and the fuel injection device 110 are installed;

Isolation diode 105: Installed between the starting battery 104 power circuit and the positive terminal of the direct current power delivered by the regulating device 201', and the power supplied from the starting battery 104 is delivered to the regulating device 201' power positive terminal in a irreversible manner;

Direct current boosted boost device 600: Consists of solid state electronic circuit elements or electromechanical circuit elements; from starting battery 104 positive power terminal, it is series connected following the direction of the current to the isolation diode 105, and is driven by the direct current power output of the regulating device 201' at its positive terminal and by the power of the engine ignition device 109 and fuel injection device 110, and direct current boosted boost circuit device 600 is started by the signal from the relay 102 when the motor power is turned on to increase voltage in order to enable the engine ignition device 109 or the fuel injection device 110 to run on a booster state advantageous to starting the engine; diode 1053 is connected in parallel between the power input terminal of the direct current boosted boost circuit device 600 and the higher homopolar voltage output terminal; when the direct current boosted boost circuit device 600 stops operating, electric energy from the power terminal are delivered through the diode 1053 to the engine ignition device 109 and the fuel injection device 110.

FIG. 8 is the operational diagram showing the variation of the battery voltage and motor start voltage in FIG. 7. Voltage V106 in FIG. 8 is the terminal voltage of the primary charging and discharging auxiliary power storage device 106 while V600 is the output voltage of the boosted boost circuit device 600.

Engine ignition device 109, fuel injection device 110, start battery 104, generator 200, regulating device 201, regulating device 201', isolation diode 105, diode 1051, diode 1052 and direct current boosted boost circuit device 600 in FIG. 7 are separately installed or combined by two or more of the aforementioned components.

Figure 9:
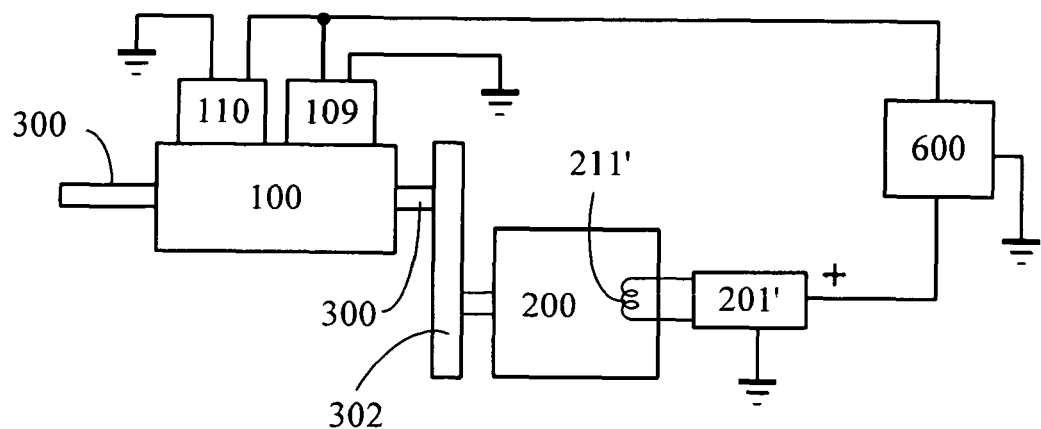
FIG. 9 is a circuit diagram formed by the application of the present invention on a manually started engine with the installation of a direct current boosted boost circuit device

If the engine in operational diagram FIG. 9 is manually started, and because it is not equipped with starting motor 101, starting battery 104 and isolation diode 105, power is supplied solely by the generator 200 winding and the regulating device 201'. So when the manually started engine speed is relatively slow and the generator 200 voltage is low, the generated electric energy of the generator 200 is stepped up by means of the direct current boosted boost circuit device 600. And during normal operation, the generated electric energy is stepped down to normal voltage in order to improve the operation of the engine ignition device 109 and/or the fuel injection device 110. Methods for checking normal operation include:

(1) Check reference on engine speed signals;
(2) Refer to generator voltage;
(3) By setting the transfer to normal voltage when the step up start time expires.

FIG. 9 is the circuit diagram formed by the application of the present invention on a manually started engine with the installation of a direct current boosted boost circuit device.

Figure 10:
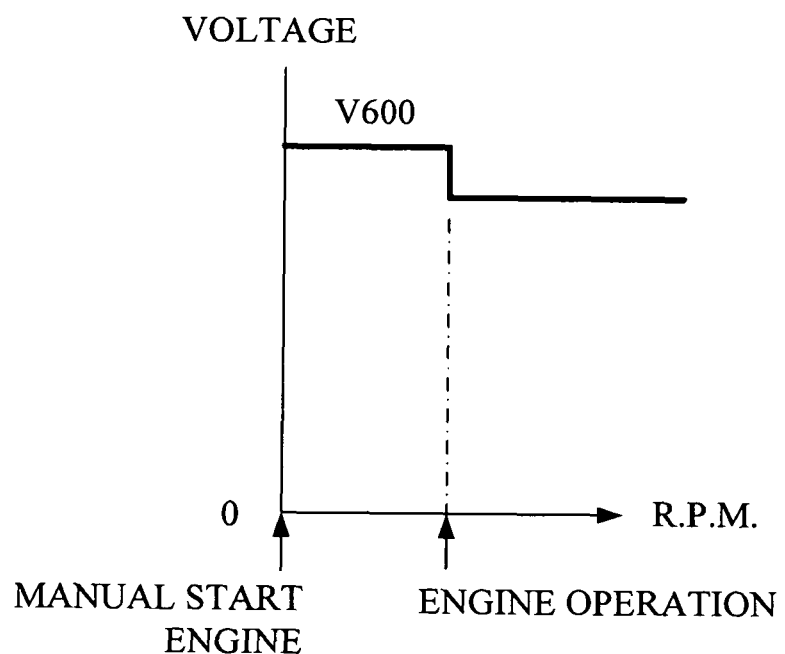
FIG. 10 is a schematic diagram showing the variation of the direct current boosted boost circuit device output voltage in FIG. 9

FIG. 10 is an operational diagram showing the variation of the direct current boosted boost circuit device output voltage in FIG. 9.

The ignition device 109, fuel injection device 110, generator 200, regulating device 201' and the direct current boosted boost circuit device 600 are separately installed or combined by two or more of the aforementioned components.

The invention claimed is:

1. A split-type auxiliary power combustion and emergency starting system that relies on the installation of an auxiliary power storage device that exclusively supply the required electric energy to the ignition device or to the fuel injection device and on the installation of a split-type charging power to isolate battery power for starting motor, in order to prevent the sudden drop of the working voltage of the ignition device or the fuel injection device that can hinder normal engine start due to the substantial drop of battery voltage as a result of the greater current required in starting motor when the engine is started; furthermore, the system is equipped with emergency starting switch device (500) and/or direct current boosted boost circuit device (600) so that when starting battery power is insufficient during starting, the electric energy of the power storage device can drive and starting motor in order to start the engine by means of operating the emergency starting switching device; and that the voltage boost of the direct current boosted boost circuit device (600) will enable the ignition device or the fuel injection device to step up in order to strengthen its starting capability when the motor is started to start the engine, wherein main components of the split-type auxiliary power combustion and emergency starting system include:

engine set (100): which consists of an internal combustion engine using diesel, biodiesel, gasoline, natural gas or methanol as fuel and equipped with a starting motor (101);

engine rotating shaft (300): arranged to supply a rotating kinetic energy engine output to drive loads, and to couple with the starting motor (101) by means of the transmission device (301), directly or by means of the transmission device (302) to couple with the generator set (200);

starting motor (101): which consists of brush or brushless direct current or alternating current motors or generators with motor capability, wherein by operating the motor start relay (102), the battery electric energy is controlled to drive the starting motor (101), directly or through the transmission device (301) affecting the generator set (100);

starting switch (103): which consists of electromechanical switching elements or solid state electronic switching elements to supply and control power from starting battery (104) to the ignition device or the ignition device and/or the fuel injection device (110); and/or to supply power and control motor starting relay (102); or to directly supply power and control staring motor (101); and/or to supply power to other car electrical devices;

starting battery (104): which consists of various rechargeable secondary batteries or super capacitance to supply electric energy to the starting motor (101); and to accept the electric energy generated by the generator winding (211) of the generator (200) or external charging energy;

primary charging and discharging auxiliary power storage device (106): which consists of various charging and discharging batteries or super capacitance to store generated electric energy from the starting battery (104) or from the generator winding (211') of the engine-driven generator (200); or to accept electric energy from external charging devices;

secondary charging and discharging auxiliary power storage device (107): which consists of a secondary charging and discharging battery or super capacitance to store electrical energy from the primary charging and discharging auxiliary power storage device (106) in order to supply instant electric energy to the engine ignition device (109) during engine ignition;

isolation diode (108): located between the primary charging and discharging auxiliary power storage device (106) and the secondary charging and discharging auxiliary power storage device (107), and the current direction from the primary charging and discharging auxiliary power storage device (106) to the secondary charging and discharging auxiliary power storage device (107) is in series with the isolation diode (108) in order to prevent reverse discharge by the secondary charging and discharging auxiliary power storage device (107) on the primary charging and discharging auxiliary power storage device (106) when using the primary charging and discharging auxiliary power storage device (106) as the power source in starting the motor in an emergency while operating the emergency starting switching device (500);

generator (200): which consists of alternating or direct current generator driven by the engine directly or through a transmission device (302), and the generator (200) has at least two mutually insulated generator windings (211) and (211') to separately generate relative alternating electric energy or to deliver rectified direct current electric energy output or to directly generate direct current electric energy output, wherein by means of the mutually insulated generator windings (211) and (211') installed in the generator (200), the electric energies of the starting battery (104) and the primary charging and discharging auxiliary power storage device (106) are isolated from each other so that when generator (200) becomes a direct current direct current generator and generator windings (211) and/or (211') do not possess reverse current avoidance function; and/or regulating devices (201) and/or (201') do not possess reverse current avoidance function; isolation is then made according to the charging current direction by the generator winding (211) on the starting battery (104) through the regulating device (201) and the forward series installation of diode (1051), isolation is also made according to the charging current direction by the generator winding (211') on the primary charging and discharging auxiliary power storage device (106) through the regulating device (201') and the forward series installation of diode (1052); and wherein if generator winding (211) and/or generator winding (211') possess reverse current avoidance function or the regulating device (201) and/or regulating device (201') possess reverse current avoidance function, then the installation of diodes (1051) and (1052) are unnecessary;

regulating devices (201) and (201'): which consist of electromechanical type or solid state electronic circuits to directly regulate and separately charge the starting battery (104), the primary charging and discharging auxiliary power storage device (106), the secondary charging and discharging auxiliary power storage device (107), and to supply power to other loads when the generator (200) becomes a direct current generator, when the generator (200) becomes an alternating current generator, the alternating current electric energy must be first rectified to direct current then passed through a regulating device (201) before it can charge the starting battery (104), and/or the primary charging and discharging auxiliary power storage device (106), and/or the secondary charging and discharging auxiliary power storage device (107), and to supply power to other loads;

engine ignition device (109): which consists of electromechanical circuit elements or solid state electronic circuit elements or the combination of both elements to provide ignition to an internal combustion engine for running the engine;

fuel injection device (110): which consists of a fuel injection structural device with throttle switching function to control injection width, and circuit control devices for operating fuel injection structural devices that are able to refer to throttle opening, oil temperature, air intake temperature, and oxygen-containing crankshaft signals (IP-ARB);

wherein any one or both of the engine ignition device (109) and the fuel injection device (110) are installed;

wherein any one or both of the emergency starting switching device (500) and the direct current boosted boost circuit device (600) are installed, the emergency starting switching device (500) and the current boosted boost circuit device (600) including:

emergency starting switching device (500): which consists of three-terminal type solid state electronic switching device or mechanical switching device; the common C terminal is the positive power terminal leading to the motor starting relay (102) and starting switch (103); the normally closed A terminal is the positive terminal leading to the starting battery (104); the normally opened B terminal which is switch able to closed during an emergency is the positive terminal leading to the primary charging and discharging auxiliary power storage device (106); when battery starting power is insufficient, operating the auxiliary switching device can enable the auxiliary battery electric energy to drive and start the motor which in turn will start the engine; and direct current boosted boost device (600): which consists of solid state electronic circuit elements or electromechanical circuit elements installed between the power mains of the secondary charging and discharging auxiliary power storage device (107) and the power mains of the engine ignition device (109) and the fuel injection device (110); direct current boosted boost circuit device (600) is started by the signal from the relay (102) when the motor power is turned on to increase voltage in order to enable the engine ignition device (109) or the fuel injection device (110) to run on a booster state advantageous to starting the engine; diode (1053) is connected in parallel between the power input terminal of the direct current boosted boost circuit device (600) and the higher homopolar voltage output terminal; when the direct current boosted boost circuit device (600) stops operating, electric energy from the power terminal are delivered through the diode (1053) to the engine ignition device (109) and the fuel injection device (110).

2. A split-type auxiliary power combustion and emergency starting system as claimed in claim 1, wherein the engine ignition device (109), fuel injection device (110), starting battery (104), primary charging and discharging auxiliary power storage device (106), isolation diode (108), secondary charging and discharging auxiliary power storage device (107), emergency starting switching device (500), generator (200), regulating device (201), regulating device (201') and direct current boosted boost circuit device (600) are separately installed or combined by two or more of the aforementioned components.

3. A split-type auxiliary power combustion and emergency starting system as claimed in claim 1, wherein the secondary charging and discharging auxiliary power storage device (107) and isolation diode (108) are omitted and not installed, and instead, the starting battery (104) is allowed to accept the generated electric energy from the generator winding (211) of generator (200) to regulate and control the power charging through the regulating device (201); and the primary charging and discharging auxiliary power storage device (106) accepts the generated electric energy from the generator (200) generator winding (211'), and through the regulating device (201'); the primary charging and discharging auxiliary power storage device (106) provides the required electric energy to the engine ignition device (109) and the fuel injection device (110); by operating the emergency starting switching device (500) when motor starting power is insufficient, the electric energy of the primary charging and discharging auxiliary power storage device (106) is allowed to drive the starting motor in order to run the engine, wherein both or any one of the emergency starting switching device (500) and/or the direct current boosted boost circuit device (600) are installed which shall include:

emergency starting switching device (500): which consists of three-terminal type solid state electronic switching device or mechanical switching device; the common C terminal is the positive power terminal leading to the motor starting relay (102) and starting switch (103); the normally closed A terminal is the positive terminal leading to the starting battery (104); the normally opened B terminal which is switch able to closed during an emergency is the positive terminal leading to the primary charging and discharging auxiliary power storage device (106); when battery starting power is insufficient, operating the auxiliary switching device can enable the auxiliary battery electric energy to drive and start the motor which in turn will start the engine; and direct current boosted boost device (600): which consists of solid state electronic circuit elements or electromechanical circuit elements installed between the power mains of the primary charging and discharging auxiliary power storage device (106) and the power mains of the engine ignition device (109) and the fuel injection device (110); direct current boosted boost circuit device (600) is started by the signal from relay (102) when the motor power is turned on to increase voltage in order to enable the engine ignition device (109) or the fuel injection device (110) to run on a booster state advantageous to starting the engine; diode (1053) is connected in parallel between the power input terminal of the direct current boosted boost circuit device (600) and the higher homopolar voltage output terminal; when the direct current boosted boost circuit device (600) stops operating, electric energy from the power terminal are delivered through diode (1053) to the engine ignition device (109) and the fuel injection device (110).

4. A split-type auxiliary power combustion and emergency starting system as claimed in claim 3, wherein the starting battery (104), ignition device (109), fuel injection device (110), primary charging and discharging auxiliary power storage device (106), emergency starting switching device (500), generator (200), regulating device (210), regulating device (201') and direct current boosted boost circuit device (600) are separately installed or combined by two or more of the aforementioned components.

5. A split-type auxiliary power combustion and emergency starting system as claimed in claim 1, wherein the secondary charging and discharging auxiliary power storage device (107), isolation diode (108), primary charging and discharging powers storage device (106) and emergency starting switching device (500) are omitted and not installed; power is instead supplied directly to the direct current boosted boost circuit device (600) from the starting battery (104), and the main components are:

engine set (100): which consists of internal combustion engine using diesel, biodiesel, gasoline, natural gas or methanol as fuel;

engine rotating shaft (300): arranged to supply rotating kinetic energy engine output to drive loads, and to couple with the starting motor (101) by means of the transmission device (301), directly or by means of the transmission device (302) to couple with the generator set (200);

starting motor (101): which consists of brush or brushless direct current or alternating current motors or generators with motor capability; by operating the motor start relay (102), the battery electric energy is controlled to drive the starting motor (101), directly or through the transmission device (301) affecting the generator set (100);

starting switch (103): which consists of electromechanical switching elements or solid state electronic switching elements to supply and control power from starting battery (104) to the ignition device or the ignition device and/or the fuel injection device (110); and/or to supply power and control motor starting relay (102); or to directly supply power and control staring motor (101); and/or to supply power to other car electrical devices;

starting battery (104): which consists of various rechargeable secondary batteries or super capacitance to supply electric energy to the starting motor (101); and to accept the electric energy generated by the generator winding (211) of the generator (200) or external charging energy;

generator (200): which consists of alternating or direct current generator driven by the engine directly or through a transmission device (302), and the generator (200) has at least two mutually insulated generator windings (211) and (211') to separately generate relative alternating electric energy or to deliver rectified direct current electric energy output or to directly generate direct current electric energy output;

wherein by means of the mutually insulated generator windings (211) and (211') installed in the generator (200), the electric energies of the starting battery (104) and the primary charging and discharging auxiliary power storage device (106) are isolated from each other; when generator (200) becomes a direct current direct current generator and generator winding (211) does not possess reverse current avoidance function; and/or regulating device (201) does not possess reverse current avoidance function, isolation is made according to the charging current direction by the generator winding (211) on the starting battery (104) through the regulating device (201) and the forward series installation of diode (1051); when an isolation diode (105) is installed between the output power of the regulating device (201) and the starting battery (104) power, isolation is made according to the charging current direction by the generator winding (211') on the primary charging and discharging auxiliary power storage device 106 through the regulating device (201') and the forward series installation of diode (1052), and wherein if the generator winding (211) possesses reverse current avoidance function, or the regulating device (201) possesses reverse current avoidance function, then it is unnecessary to install diode (1051);

regulating devices (201) and (201'): which consist of electromechanical type or solid state electronic circuits that separately employ the electric energy output of the generator windings (211) and (211') to directly regulate and separately charge the starting battery (104), and to supply power to other loads when the generator (200) becomes a direct current generator; however, when the generator (200) becomes an alternating current generator, the alternating current electric energy are first rectified to direct current then passed through a regulating device (201) before it can charge the starting battery (104), and to supply power to other loads;

engine ignition device (109): which consists of electromechanical circuit elements or solid state electronic circuit elements or the combination of both elements to provide ignition to an internal combustion engine for running the engine;

fuel injection device (110): which consists of a fuel injection structural device with throttle switching function to control injection width, and circuit control devices for operating fuel injection structural devices that are able to refer to throttle opening, oil temperature, air intake temperature, and oxygen-containing crankshaft signals (IP-ARB), wherein any one or both of the engine ignition device (109) and the fuel injection device (110) are installed;

isolation diode (105): which is installed between the starting battery (104) power circuit and the positive terminal of the direct current power delivered by the regulating device (201'); the power supplied from the starting battery (104) is delivered to the regulating device (201') power positive terminal in a irreversible manner; and direct current boosted boost device (600): which consists of solid state electronic circuit elements or electromechanical circuit elements; from starting battery (104) positive power terminal, it is series connected following the direction of the current to the isolation diode (105), and is driven by the direct current power output of the regulating device (201') at its positive terminal and by the power of the engine ignition device (109) and fuel injection device (110), and direct current boosted boost circuit device (600) is started by the signal from the relay (102) when the motor power is turned on to increase voltage in order to enable the engine ignition device (109) or the fuel injection device (110) to run on a booster state advantageous to starting the engine; diode (1053) is connected in parallel between the power input terminal of the direct current boosted boost circuit device (600) and the higher homopolar voltage output terminal; when the direct current boosted boost circuit device (600) stops operating, electric energy from the power terminal are delivered through the diode (1053) to the engine ignition device (109) and the fuel injection device (110).

6. A split-type auxiliary power combustion and emergency starting system as claimed in claim 5, wherein the engine ignition device (109), fuel injection device (110), starting battery (104), generator (200), regulating device (201), regulating device (201'), isolation diode (105), diode (1051), diode (1052) and direct current boosted boost circuit device (600) are separately installed or combined by two or more of the aforementioned components.

\* \* \* \* \*